No. 788,902. PATENTED MAY 2, 1905.
A. J. HAUS & A. W. LAABS.
SALT DISTRIBUTER.
APPLICATION FILED SEPT. 28, 1904.
2 SHEETS—SHEET 1.
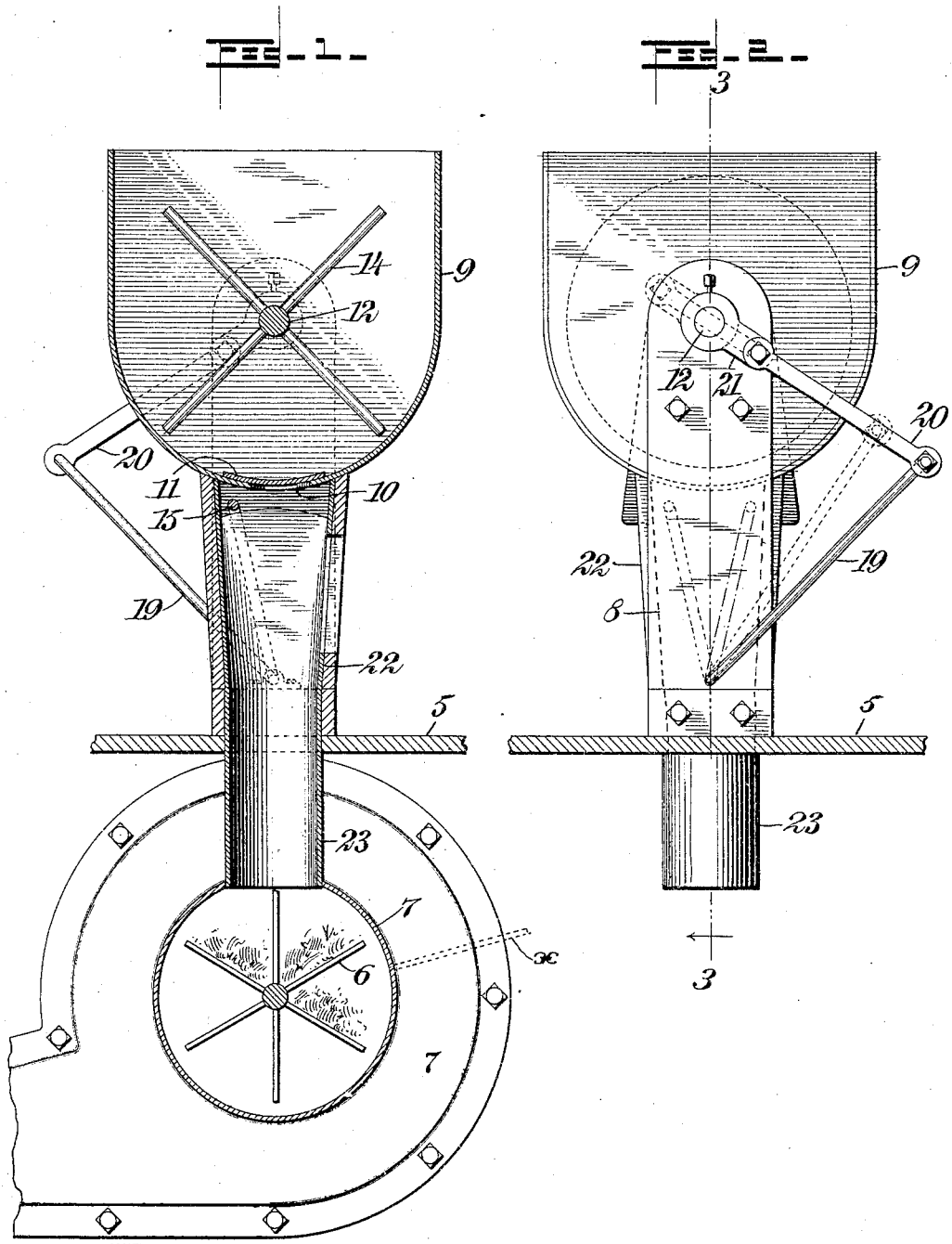
WITNESSES:
INVENTORS
Albert J. Haus
Albert W. Laabs
BY
ATTORNEYS No. 788,902. PATENTED MAY 2, 1905.
A. J. HAUS & A. W. LAABS.
SALT DISTRIBUTER.
APPLICATION FILED SEPT. 28, 1904.
2 SHEETS—SHEET 2.
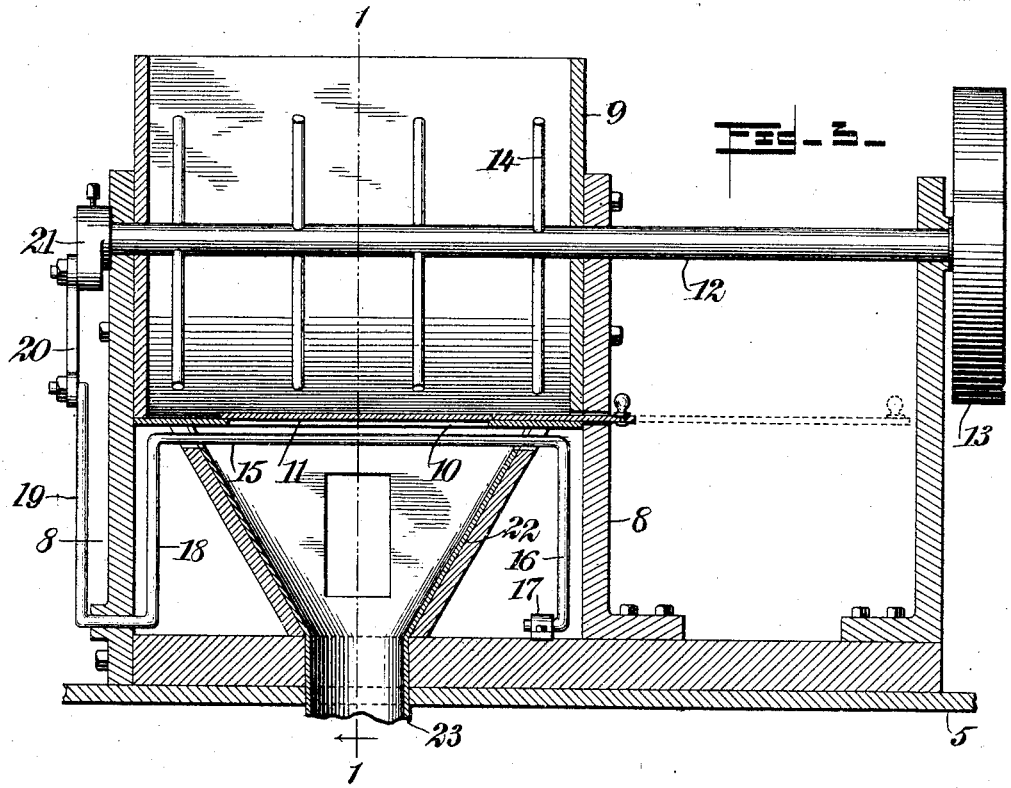
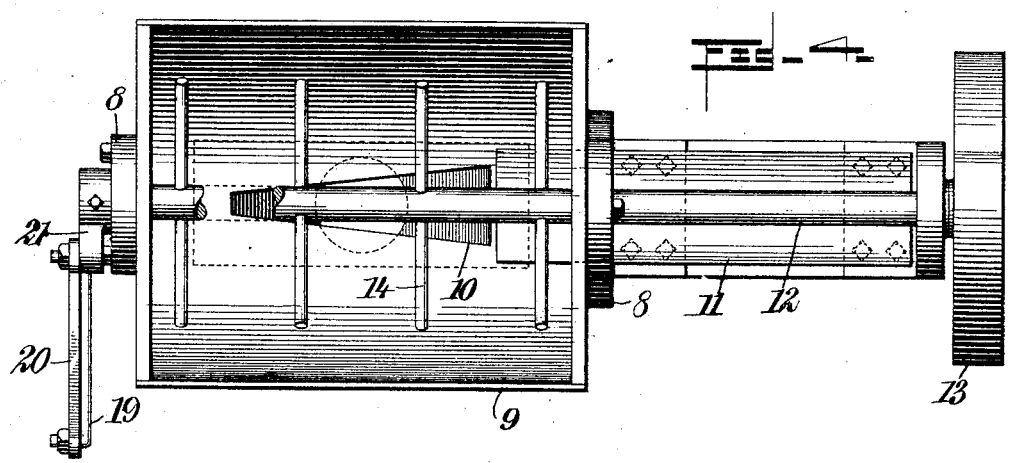
WITNESSES:
INVENTORS
Albert. J. Haus
Albert. W. Laabs
BY
ATTORNEYS No. 788,902.

Patented May 2, 1905.

UNITED STATES PATENT OFFICE.

ALBERT J. HAUS AND ALBERT W. LAABS, OF LAWLER, IOWA.

SALT-DISTRIBUTER.

SPECIFICATION forming part of Letters Patent No. 788,902, dated May 2, 1905.

Application filed September 28, 1904. Serial No. 226,414.

*To all whom it may concern:*

Be it known that we, ALBERT J. HAUS and ALBERT W. LAABS, citizens of the United States, and residents of Lawler, in the county of Chickasaw and State of Iowa, have invented a new and Improved Salt-Distributer, of which the following is a full, clear, and exact description.

This invention relates to improvements in devices for distributing salt to fodder or the like discharged from a threshing-machine or shredder, the object being to provide a distributer that will work equally well with dry salt and damp or lumpy salt.

Other objects of the invention will appear in the general description.

We will describe a salt-distributer embodying our invention and then point out the novel features in the appended claims.

Reference is to be had to the accompanying drawings, forming a part of this specification, in which similar characters of reference indicate corresponding parts in all the figures.

Figure 1 is a sectional elevation on the line 1 1 of Fig. 3 of a salt-distributer embodying our invention. Fig. 2 is a side view thereof. Fig. 3 is a section on the line 3 3 of Fig. 2, and Fig. 4 is a plan view.

Referring to the drawings, 5 designates the top of a shredder, threshing-machine, or the like of any well-known type, below which is the usual fan-blower 6, operating in a blower-casing 7. Extended upward from the top 5 are standards 8, which support a salt-hopper 9, the bottom of which is rounded or curved and is provided with a longitudinal outlet 10, which gradually increases in width from one end to the other, so that the outlet of salt may be regulated by means of a sliding cover 11, which passes outward through an opening in one of the standards 8.

Passing through the hopper 9 is a shaft 12, which may be driven by any suitable means. As here shown it is provided with a band-wheel 13, from which a band extends to a driving-wheel. (Not shown.) Extended outward from the shaft, within the hopper, are stirrer-arms 14 and having reciprocating motion across the outlet 10, and at the under side of the hopper is a breaker, consisting of a horizontal bar 15, one end, 16, of which is extended downward and engages in a bearing 17, while the other end extends downward, as indicated at 18, and then outward through a bearing in the standard 8, and from the outer end a crank portion 19 extends upward to a pivotal connection with one end of a link 20, the other end of said link 20 being pivotally connected to a crank 21 on the shaft 12. The breaker-bar extends through slots in the opposite walls of a funnel-shaped receiver 22, with which the outlet 10 communicates, and from this receiver a spout 23 extends downward into the blower-casing.

In the operation as the shaft 12 is rotated the arms 14 will thoroughly stir up the salt in the hopper 9, and the salt will pass through the outlet 10 or any portion thereof that may be open and thence pass to the blower-casing. As the shaft rotates the breaker-bar 15 will be oscillated or moved back and forth across the outlet, thus breaking up any chunks of salt that may become clogged or suspended in the outlet. As the fodder enters at the point *x*, Fig. 1, and passes through the blower-casing the fine salt will be thoroughly mixed therewith.

Having thus described our invention, we claim as new and desire to secure by Letters Patent—

1. The combination with a blower arranged in a shredder or the like, of a hopper having an outlet-opening in its lower portion, said outlet being of increasing width from one end to the other, a regulating-slide for said outlet, a pipe providing communication between the outlet and the blower-casing, a shaft extended through the hopper, outwardly-extended arms on said shaft, a breaker-bar arranged below the hopper, an upwardly-extended crank-arm having connection with said bar, a crank on the shaft, and a link connection between said crank on the shaft and the first-named crank.

2. The combination with the blower and blower-casing of a fodder device, of standards, a hopper supported by said standards and having an outlet in its lower portion, a sliding cover for said outlet, a receiver arranged below the outlet, a pipe connection between said receiver and the blower-casing, opposite side walls of said receiver being provided with openings, a beater-bar arranged below the hopper and extended through said openings, one end of said bar being extended downward and into a bearing, the other end being extended downward and then outward to a standard and then upward to form a crank, a stirrer-carrying shaft extended through the hopper, a crank on said shaft, and a link connection between said crank and the first-named crank.

In testimony whereof we have signed our names to this specification in the presence of two subscribing witnesses.

ALBERT J. HAUS.
ALBERT W. LAABS.

Witnesses:
  WM. KILCHER,
  S. F. BENZ.